United States Patent
Elstorpff et al.

(10) Patent No.: US 8,776,960 B2
(45) Date of Patent: *Jul. 15, 2014

(54) PNEUMATIC BRAKE CYLINDER

(75) Inventors: Marc-Gregory Elstorpff, München (DE); Robert Haupt, München (DE); Michael Mathieu, Puchheim (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 313 days.

This patent is subject to a terminal disclaimer.

(21) Appl. No.: 13/124,179

(22) PCT Filed: Oct. 7, 2009

(86) PCT No.: PCT/EP2009/007185
§ 371 (c)(1),
(2), (4) Date: Jun. 15, 2011

(87) PCT Pub. No.: WO2010/043325
PCT Pub. Date: Apr. 22, 2010

(65) Prior Publication Data
US 2011/0266102 A1 Nov. 3, 2011

(30) Foreign Application Priority Data
Oct. 15, 2008 (DE) .................... 10 2008 051 678

(51) Int. Cl.
| | |
|---|---|
| *F16D 65/56* | (2006.01) |
| *B60T 17/08* | (2006.01) |
| *F16D 65/28* | (2006.01) |
| *B61H 15/00* | (2006.01) |
| *F16D 121/02* | (2012.01) |

(52) U.S. Cl.
CPC ................. *B60T 17/08* (2013.01); *F16D 65/28* (2013.01); *F16D 65/56* (2013.01); *F16D 2121/02* (2013.01); *B61H 15/0028* (2013.01)
USPC .................... 188/196 V; 188/203; 188/196 D

(58) Field of Classification Search
USPC ............ 188/198, 202, 203, 196 V, 71.7, 71.8, 188/71.9, 196 D
See application file for complete search history.

(56) References Cited

U.S. PATENT DOCUMENTS

| | | | |
|---|---|---|---|
| 3,744,596 A | 7/1973 | Sander | |
| 3,899,053 A * | 8/1975 | Nadas ........................... | 188/203 |

(Continued)

FOREIGN PATENT DOCUMENTS

| | | |
|---|---|---|
| DE | 28 30 361 | 1/1980 |
| DE | 100 54 149 A1 | 5/2002 |

(Continued)

OTHER PUBLICATIONS

International Search Report for International Application No. PCT/EP2009/007185, dated Mar. 5, 2010.

(Continued)

*Primary Examiner* — Robert A Siconolfi
*Assistant Examiner* — Vu Q Nguyen
(74) *Attorney, Agent, or Firm* — Barnes & Thornburg LLP

(57) ABSTRACT

The invention relates to a pneumatic brake cylinder including a piston for transferring the pneumatic pressure to a brake, and a device for automatic adjustment in the event of wear of the brake linings, the device comprising a spindle, an adjusting nut, and a control sleeve that can be engaged with the adjusting nut. According to the invention, the control sleeve is embodied as a composite part including a metallic coupling ring and a sliding sleeve of a plastic material.

8 Claims, 3 Drawing Sheets

(56) References Cited

U.S. PATENT DOCUMENTS

| | | |
|---|---|---|
| 6,684,989 B2 | 2/2004 | Berra et al. |
| 2004/0168867 A1 | 9/2004 | Kerscher et al. |
| 2009/0260930 A1* | 10/2009 | Lotz .................. 188/196 BA |

FOREIGN PATENT DOCUMENTS

| | | |
|---|---|---|
| DE | 20 2006 010 681 U1 | 12/2007 |
| EP | 0 036 568 | 9/1981 |
| EP | 0 050 573 | 4/1982 |
| EP | 0 121 815 | 10/1984 |
| EP | 0 165 641 | 12/1985 |
| EP | 0 250 927 | 1/1988 |
| EP | 0 250 929 | 1/1988 |

OTHER PUBLICATIONS

German Office Action of Application No. 10 2008 051 678.3, Jan. 8, 2013.

Transmittal of International Preliminary Report on Patentability for International Application No. PCT/EP2009/071845 and Written Opinion.

English Translation of the International Preliminary Report on Patentability for International Application No. No. PCT/EP2009/007185 and Written Opinion.

* cited by examiner

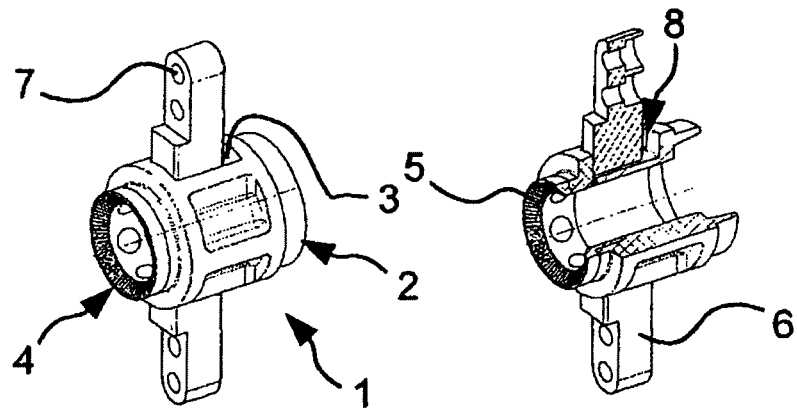
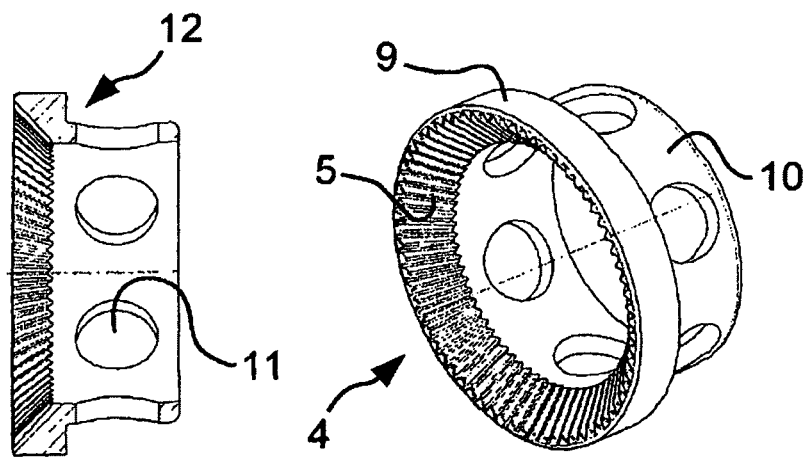

PNEUMATIC BRAKE CYLINDER

CROSS-REFERENCE TO RELATED APPLICATIONS

The present application claims the benefit of priority to International Patent Application No. PCT/EP2009/007185 filed 7 Oct. 2009, which further claims the benefit of German Patent Application No. 10 2008 051 678.3 filed 15 Oct. 2008, the contents of which are incorporated herein by reference in their entirety.

FIELD OF THE INVENTION

Disclosed embodiments relate to a pneumatic brake cylinder.

BACKGROUND

Brake cylinders of this type are used, inter alia, in rail vehicles. There, they are frequently used to actuate a brake caliper, with the aid of which brake linings are pressed onto a brake disk. Here, the piston stroke is to always be approximately equally great, independently of the wear of the brake linings. For this purpose, an adjusting device is usually provided which has a spindle which is guided in a piston tube and an adjusting nut. During the normal braking operation, the adjusting nut is blocked in such a way that only a linear movement in the direction of the longitudinal axis of the brake cylinder is permitted, but not a rotational movement. A rotation of the adjusting nut may only be permitted for the adjusting operation when a certain wear of the brake linings has taken place. In order to control the rotational movement of the adjusting nut, what is known as a control sleeve is used which is arranged within the piston tube such that it can be displaced on the spindle.

A toothing system which can engage into a corresponding toothing system of the adjusting nut is usually provided on that side of the control sleeve which faces the adjusting nut. Since the control sleeve has to absorb high loadings, it is produced nowadays from a heavy metal continuous casting. Although this material ensures a high strength which is sufficient for this use, it permits only a relatively rough formation of the toothing system. This factor greatly limits the accuracy during the adjustment of the brake cylinder.

SUMMARY

The disclosed embodiment configure a pneumatic brake cylinder in such a way that, in the case of wear of the brake linings, very exact adjustment of the brake cylinder can take place. The production costs for the brake cylinder are to be reduced despite the improved adjustment.

According to the disclosed embodiments, the use of a control sleeve which is configured as a composite part which has a metallic coupling ring and a sliding sleeve made from plastic, the production costs can be reduced in comparison with the previously customary continuous casting. The metallic coupling ring can be configured, for example, as an extruded steel part. This makes the inexpensive production of a very fine and precise toothing system possible. The use of plastic for the sliding sleeve has likewise proven to be very inexpensive. The plastic of the sliding sleeve has a pronounced damping action during the absorption of the torque which is exerted by the adjusting nut. As a result, the wear of the toothing system, despite the higher degree of fineness, is reduced in comparison with the control sleeve made from a continuous casting. The weight of the pneumatic brake cylinder could also be reduced by the use of the novel control sleeve.

BRIEF DESCRIPTION OF THE FIGURES

Further details and advantages of the disclosed embodiments result from the description of one exemplary embodiment which will be explained in detail using the drawing, in which:

FIG. 4 shows a three-dimensional illustration of one preferred exemplary embodiment of a control sleeve with inserted sliding blocks, FIG. 5 shows the control sleeve from FIG. 4 in a sectioned illustration, FIG. 6 shows a section through the coupling ring of the control sleeve from FIGS. 4 and 5, FIG. 7 shows the coupling ring in a three-dimensional illustration.

DETAILED DESCRIPTION

Figure 1:
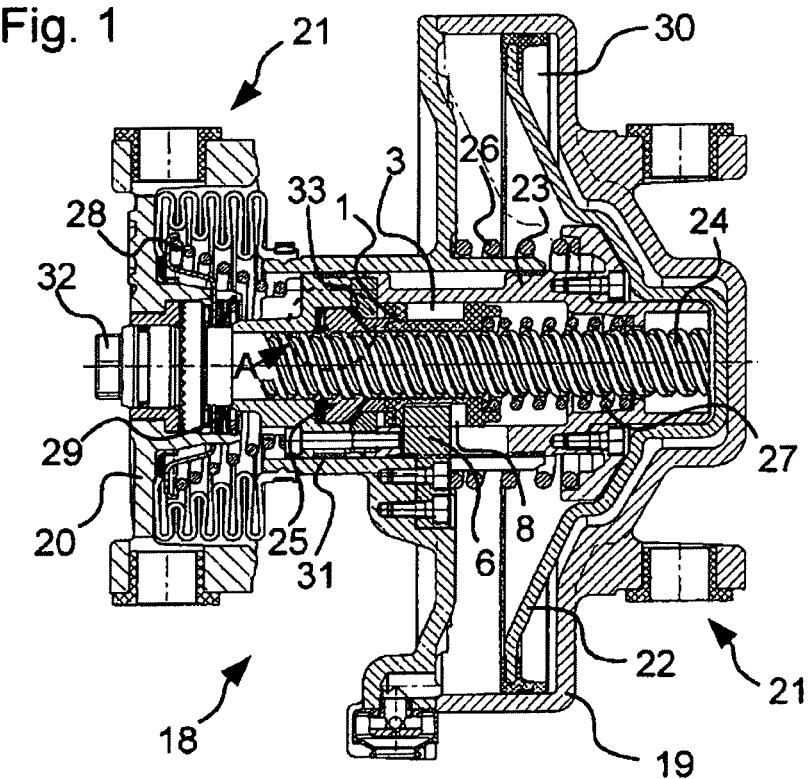
FIG. 1 shows a section through a pneumatic brake cylinder according to the disclosed embodiments.

In accordance with disclosed embodiments, the coupling ring is particularly advantageously encapsulated using injection molding by the sliding sleeve or the sliding sleeve is injection molded into the coupling ring. In this way, a fixed connection is brought about between the sliding sleeve and the coupling ring, without it having been necessary to perform an additional mounting step.

The coupling ring is advantageously provided with apertures in the region which is connected to the sliding sleeve. During the injection molding of the control sleeve, this leads to the apertures being filled with plastic. The connection between the coupling ring and the sliding sleeve is strengthened as a result. In particular, greater torques can be transmitted from the coupling ring to the sliding sleeve as a result.

The coupling ring has a toothing system for the positively locking engagement into a toothing system of the adjusting nut. Since the toothing system of the coupling ring can be of very fine configuration, very precise adjustment of the brake cylinder is possible. As a result of the positively locking connection between the coupling ring and the adjusting nut, a great torque can be transmitted despite the fine toothing system.

The toothing system is advantageously attached on the free end side of the coupling ring and is configured as an oblique internal toothing system. A great engagement surface area is thus ensured in conjunction with an oblique external toothing system on an end side of the adjusting nut. The oblique position of the two toothing systems also at the same time brings about a centering action, with the result that the toothing system of the control sleeve and the toothing system of the adjusting nut are in each case in engagement with one another over their full surface area.

According to disclosed embodiments, a locking device is provided which prevents rotation of the control sleeve. In this way, the torque which is transmitted by the adjusting nut can be absorbed reliably. The locking device is configured in such a way that only the rotation of the control sleeve is prevented. In contrast, a displacement of the control sleeve in the direction of the longitudinal axis of the brake cylinder is permitted in a predefined range.

A piston tube is advantageously provided which is actuated by the piston. Said piston tube has slot-shaped openings, through which the locking arms extend. The slot-shaped openings are dimensioned in such a way that the movement of the control sleeve can be decoupled from the movement of the piston tube.

The locking arms engage with their free end into slot-shaped cutouts. The width of the slot-shaped cutouts is adapted to the width of the locking arms. In this way, rotation of the control sleeve is prevented reliably.

The longitudinal extent of the slot-shaped cutouts is dimensioned in such a way that the cutouts act as a stop for the control sleeve and restrict a sliding movement of the control sleeve. Here, the permitted sliding section of the control sleeve corresponds to the spacing of the brake linings from the brake disk plus the elastic deformation of the parts which transmit the braking force between the brake cylinder and the brake linings.

In one exemplary embodiment, the slot-shaped cutouts are provided in the housing of the brake cylinder or a part which is connected to the latter. The locking arms are connected fixedly to the sliding sleeve and are advantageously injection molded onto the latter. In this exemplary embodiment, the locking arms move together with the sliding sleeve.

In another exemplary embodiment, the slot-shaped cutouts are provided in the sliding sleeve itself. In contrast, the locking arms are configured as sliding blocks and are connected fixedly to the housing of the brake cylinder, in particular are screwed to it. In this particularly advantageous exemplary embodiment, the sliding blocks do not have to be moved. As a result, the weight of the control sleeve can be reduced further. The lower weight of the control sleeve makes itself felt by reduced inertia during its movement. As a result, even higher precision is possible in the adjustment of the brake cylinder.

It should be noted, that the disclosed embodiments may have been described above and below with respect to different subject-matter. In particular, some embodiments may be described with reference to apparatus components, whereas those or other embodiments have been described with reference to methodologies. However, a person skilled in the art will gather from the above and the following description that, unless notified otherwise, in addition to any combination features belonging to one type of subject-matter also any combination between features relating to different subject-matter, in particular between features of apparatuses and features of methodologies, is considered to be disclosed with this application.

The design of the novel control sleeve can be gathered from FIGS. 4-11, one preferred exemplary embodiment being shown in FIGS. 4-9. The control sleeve 1 is constructed as a composite part, a coupling ring 4 having been connected to a sliding sleeve 2. The coupling ring 4 is configured as an extruded steel part and comprises a toothed ring 9 and a connecting ring 10. The connecting ring 10 and the toothed ring 9 have the same internal diameter, whereas the external diameter of the toothed ring 9 is dimensioned to be greater than the external diameter of the connecting ring 10. As a result, the step 12 is produced in the outer contour of the coupling ring 4. The free end side of the toothed ring 9 is provided with an oblique internal toothing system 5. The connecting ring 10 has a number of round apertures 11.

Two sliding channels 3 which lie opposite one another are machined into the sliding sleeve 2. The sliding blocks 6 engage into the sliding channels 3. The width of the sliding blocks 6 is adapted exactly to the width of the sliding channels 3, with the result that no rotational movement of the sliding sleeve 2 is possible if the sliding blocks 6 are fixed. In order for it to be possible to fix the sliding blocks 6, the fastening holes 7 are provided which serve, in particular, to receive screws. The longitudinal extent of the sliding channels 3 is dimensioned in such a way that the feed gap 8 remains during engagement of the sliding blocks 6. The significance of the feed gap 8 will be explained in greater detail further below during the functional description of the brake cylinder.

During the production of the control sleeve 1, the coupling ring is inserted into the injection molding die. During the injection molding of the control sleeve 1, the plastic also fills the step 12 of the coupling ring 4 and enters the apertures 11 of the connecting ring 10. As a result, an excellent connection is ensured between the coupling ring 4 and the sliding sleeve 2. The plastic in the apertures 11 prevents the components from being able to rotate with respect to one another.

Figure 10:
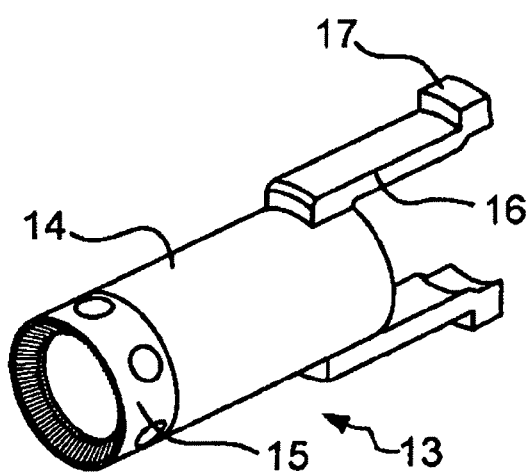
FIG. 10 shows a second exemplary embodiment of a control sleeve in a three-dimensional illustration with integrally formed locking arms.
Figure 11:
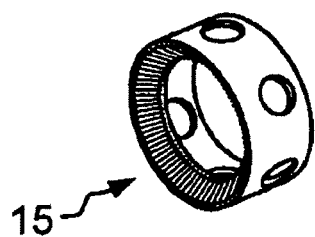
FIG. 11 shows the coupling ring of the control sleeve from FIG. 10 without a sliding sleeve.

FIGS. 10 and 11 show a further exemplary embodiment of a control sleeve. The coupling ring 15 which is used here has a stepless outer circumference. The step for receiving the sliding sleeve 14 is situated here on the inner side of the coupling ring 15. While the coupling ring 4 is plugged in the sliding sleeve 2 in the first exemplary embodiment according to FIGS. 4-9, the sliding sleeve 14 is plugged in the coupling ring 15 in this exemplary embodiment. Here too, apertures are provided which, filled with the plastic of the sliding sleeve 14, bring about an antirotation safeguard between the sliding sleeve 14 and the coupling ring 15.

In the exemplary embodiment according to FIGS. 10 and 11, locking arms 16 are injection molded directly onto the sliding sleeve 14. The locking arms 16 have runners 17, by way of which the locking arms engage into a stop ring which is screwed to the brake cylinder. Here too, recesses are provided in accordance with the sliding channels 3 of the first exemplary embodiment, with the result that a certain longitudinal displacement of the runners 17 is possible. The extent of the displacement corresponds to the feed gap 8 in the first exemplary embodiment.

The use of the novel control sleeve will be explained using the pneumatic brake cylinder which is shown in FIG. 1. The fastenings 21 for a brake caliper are situated firstly on the yoke 20 and secondly on the housing 19. In order to actuate the brake, the brake caliper (not shown here) has to be pressed apart. This means that the spacing between the yoke 20 and the housing 19 has to be enlarged.

The piston 22 is provided in the housing 19. The pressure space 30 is situated between the piston 22 and the housing 19. The compressed air connection, via which compressed air is fed to the pressure space 30, cannot be seen in this illustration. The piston tube 23 is actuated by the piston 22. However, the piston 22 is not connected fixedly to the piston tube 23, but rather is inserted loosely into the brake cylinder. The actuation of the piston tube 23 takes place merely via an annular bearing face, with which the piston 22 presses onto the piston tube 23.

Slots are provided in the piston tube 23, through which slots sliding blocks 6 extend which are screwed to the housing 19. This measure prevents rotation of the piston tube 23 with respect to the housing 19, but in contrast permits a longitudinal displacement of the piston tube 23. In the case of the longitudinal displacement, the piston tube 23 is supported by the annular sliding bands 31 on the inner wall of the housing 19. The piston 22 and the piston tube 23 are held in their rest position by the piston return spring 26 which is supported on the housing 19 and the piston tube 23.

The spindle 24 is situated in the piston tube 23. The position of the spindle 24 is controlled by the adjusting nut 25. The adjusting nut 25 and spindle 24 are connected to one another via a thread which is not self-locking, with the result that a force in the direction of the longitudinal axis of the spindle 24 exerts a torque on the adjusting nut 25. This force is exerted on the spindle 24 by the conical spring 28 which is supported on the yoke 20 and the piston tube 23. The conical spring 28 therefore exerts a force which attempts to pull the spindle 24 out of the cone tube 23.

Figure 2:
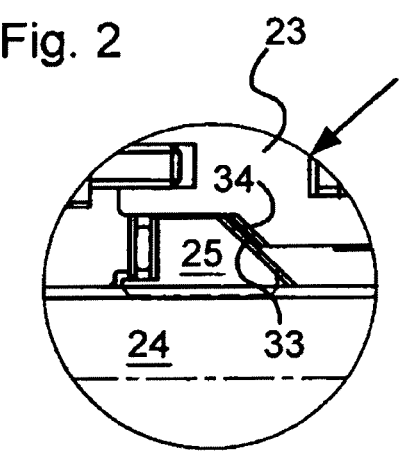
FIGS. 2 and 3 show detail illustrations of the brake cylinder which is shown in FIG. 1.
Figure 3:
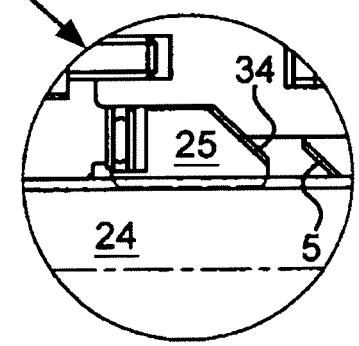
Figure 8:
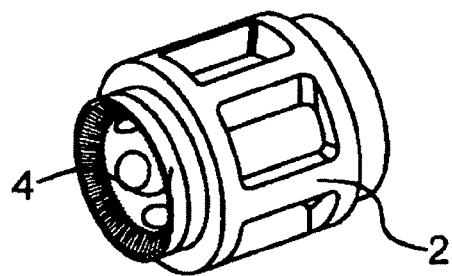
FIG. 8 shows a three-dimensional illustration of the preferred exemplary embodiment of the control sleeve without locking arms.
Figure 9:
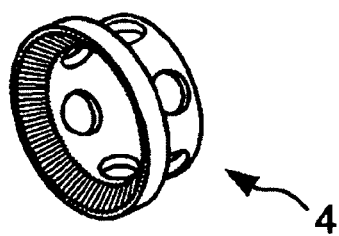
FIG. 9 shows the coupling ring of the control sleeve from FIG. 8 without a sliding sleeve.

On its oblique end side, the adjusting nut 25 has an external toothing system 34 (see, in particular, FIGS. 2 and 3 which illustrate the part denoted by A in FIG. 1 on an enlarged scale and in different working states). The internal toothing system 5 of the control sleeve 1 is normally in engagement with the external toothing system 34 of the adjusting nut 25. The control sleeve 1 is prevented from rotating via the sliding blocks 6 which are screwed to the housing 19. As a result of the engagement of the internal toothing system 5 of the control sleeve 1 with the external toothing system 34 of the adjusting nut 25, the latter is likewise prevented from rotating. The control sleeve 1 is prestressed via the locking spring 27 which is supported on the control sleeve 1 and on the piston tube 23. A toothed ring which is connected to the spindle 24 is pressed into a toothing system of the yoke 20 with the aid of the disk spring 29, with the result that rotation of the spindle 24 with respect to the yoke 20 is prevented.

In the following text, the function of the brake cylinder 18 is to be described:

The piston 22 is pressed to the left by an increase of the pneumatic pressure in the pressure space 30. Here, it actuates the piston tube 23 and likewise presses it to the left, counter to the force of the piston return spring 26. The control sleeve 1 which is prestressed by the locking spring 27 is pressed with its internal toothing system 5 onto the external toothing system 34 of the adjusting nut 25 and likewise moves to the left together with the piston tube 23, spindle 24, adjusting nut 25 and yoke 20. In contrast, the piston tube toothing system 33 is not in engagement with the external toothing system of the adjusting nut 25. This state is shown in FIG. 2.

At the moment, at which the control sleeve 1 has been displaced so far to the left that the feed gap 8 between the sliding blocks 6 and the boundary of the sliding channels 3 is closed, the brake linings (not shown here) come into contact with the brake disk. From this point in time, a counterpressure is built up via the yoke 20. Since the feed gap 8 has now been closed, the control sleeve 1 can no longer participate in a further movement of the piston tube 23.

The piston tube 23 is then displaced further to the left by a small amount, counter to the force of the conical spring 28, while the yoke 20, spindle 24 and adjusting nut 25 remain at the same location. As a result of this displacement of the piston tube 23 with respect to the adjusting nut 25, the external toothing system 34 of the adjusting nut 25 comes out of engagement with the internal toothing system 5 of the control sleeve 1. At the same time, however, the external toothing system 34 comes into engagement with the piston tube toothing system 33.

In the case of a further build up of pressure in the pressure space 30, the brake linings are pressed against the brake disk, the piston tube 23 being pressed with great force against the adjusting nut 25. As a result of these forces which are directed counter to one another of the piston 22 and piston tube 23 on one side and of the yoke 20, spindle 24 and adjusting nut 25 on the other side, a torque is exerted on the adjusting nut 25. This torque is absorbed by the piston tube toothing system 33 and transmitted to the piston tube 23. The torque passes to the housing 19 via the sliding blocks 6. The housing 19 is connected to the brake caliper via the fastenings 21 in such a way that the torque is finally absorbed here. This state of the piston tube 23, adjusting nut 25 and control sleeve 1 is shown in FIG. 3.

When the brake is released, the piston tube toothing system 33 is also released again from the external toothing system 34 of the adjusting nut 25. At the same time, the external toothing system 34 of the adjusting nut 25 comes into engagement again with the internal toothing system 5 of the control sleeve 1.

Whereas no rotation of the adjusting nut 25 is permitted during a normal braking operation, the adjusting nut 25 has to be able to rotate when an adjustment becomes necessary on account of wear of the brake linings. If a certain amount of wear of the brake linings has taken place, the gap between the brake linings and the brake disk has also increased. As a result, a greater piston stroke is necessary, in order to bring the brake linings into contact with the brake disk.

The braking process is initiated as in the case of a normal braking operation. The piston 22, piston tube 23 and control sleeve 1 move together to the left. The control sleeve 1 participates in this movement until the feed gap 8 is closed. The internal toothing system 5 of the control sleeve 1 is then decoupled from the external toothing system 34 of the adjusting nut 25. In contrast with a normal braking process, however, no counterpressure is then built up, since the brake linings are not yet in contact with the brake disk. As a result, the piston tube toothing system 33 does not yet couple into the external toothing system 34 of the adjusting nut 25. A force is exerted via the conical spring 28 on the yoke 20 and spindle 24, which force attempts to pull the spindle 24 to the left out of the piston tube 23. Here, a torque acts on the adjusting nut 25. Since, in this state, the external toothing system 34 of the adjusting nut 25 is coupled neither to the internal toothing system 5 of the control sleeve 1 nor to the piston tube toothing system 33, the adjusting nut 25 can yield to the torque and rotates on the spindle 24. As a result of this rotation of the adjusting nut 25, the spindle 24 can be pulled out to the left relative to the adjusting nut 25.

The rotation of the adjusting nut 25 continues until the brake linings have come into contact with the brake disk. At this moment, a counterpressure is built up again which brings about coupling of the piston tube toothing system 33 to the external toothing system 34 of the adjusting nut 25. The adjusting operation is therefore finished and further braking processes take place again without adjustment until a certain amount of wear of the brake linings has occurred once again.

If an adjustment is no longer possible, the brake linings have to be changed. Here, the brake cylinder 18 also has to be reset into its original state again. To this end, force is applied to the return hexagon 32 and the spindle 24 is turned completely into the piston tube 23 again. During the first braking process, after the mounting of the new brake linings, an adjustment takes place again, with the result that here too the predefined spacing between the brake linings and the brake disk is automatically set correctly.

LIST OF DESIGNATIONS

1 Control sleeve
2 Sliding sleeve
3 Sliding channel
4 Coupling ring
5 Internal toothing system
6 Sliding block
7 Fastening hole
8 Feed gap
9 Toothed ring
10 Connecting ring
11 Aperture
12 Step
13 Further exemplary embodiment of a control sleeve
14 Sliding sleeve
15 Coupling ring
16 Locking arm
17 Runner
18 Brake cylinder
19 Housing
20 Yoke
21 Fastening for brake caliper
22 Piston
23 Piston tube
24 Spindle
25 Adjusting nut
26 Piston return spring
27 Locking spring
28 Conical spring
29 Disk spring
30 Pressure space
31 Sliding band
32 Return hexagon
33 Piston tube toothing system
34 External toothing system of the adjusting nut

The invention claimed is:

1. A pneumatic brake cylinder comprising:
a piston configured to transmit pneumatic pressure to a brake,
a device configured to automatically adjust for wear of brake linings, the device including a spindle, an adjusting nut and a control sleeve which is configured to be engaged with the adjusting nut,
wherein the control sleeve is configured as a composite part which has a metallic coupling ring and a sliding sleeve made from plastic, wherein the sliding sleeve and the coupling ring are fixedly connected and the coupling ring is provided with apertures filled with plastic in a region connected to the sliding sleeve,
wherein a longitudinal extent of slots provided in spaced relation to the control sleeve are dimensioned in such a way that the slots act as a stop for the control sleeve and restrict a sliding movement of the control sleeve, wherein a permitted sliding section of the control sleeve corresponds to a spacing of the brake linings from a brake disk plus an elastic deformation of parts which transmit the braking force between the brake cylinder and the brake linings
wherein the coupling ring has a toothing system for a positively locking engagement into a toothing system of the adjusting nut, wherein the toothing system of the coupling ring is attached on a free end side of the coupling ring and is configured as an oblique internal toothing system, and
wherein the adjusting nut has an oblique external toothing system on one end side, and wherein positions of the oblique internal toothing system and oblique external toothing system provide a centering action so that the oblique internal toothing system of the control sleeve and the oblique external toothing system of the adjusting nut are in engagement with one another over their full surface area.

2. The pneumatic brake cylinder of claim 1, wherein the coupling ring is encapsulated using injection molding by the sliding sleeve or the sliding sleeve is injection molded into the coupling ring.

3. The pneumatic brake cylinder of claim 2, wherein the coupling ring is provided with apertures in the region which is connected to the sliding sleeve.

4. The pneumatic brake cylinder of claim 1, further comprising a locking device that interacts with the slots and prevents rotation of the control sleeve.

5. The pneumatic brake cylinder of claim 4, wherein the locking device has locking arms which extend through the slots.

6. The pneumatic brake cylinder of claim 5, wherein the slots are located in a piston tube and locking arms engage with a free end into the slots of the piston tube.

7. The pneumatic brake cylinder of claim 5, wherein the slots are provided in a housing of the brake cylinder or a part which is connected to the brake cylinder, and the locking arms are injection molded onto the sliding sleeve.

8. The pneumatic brake cylinder of claim 5, wherein the slots are provided as a sliding channel in the sliding sleeve and the locking arms are screwed to a housing of the brake cylinder.

* * * * *